United States Patent
Wang et al.

(10) Patent No.: US 8,259,482 B2
(45) Date of Patent: Sep. 4, 2012

(54) POWER ADAPTER APPARATUS AND POWER MANAGEMENT METHOD

(75) Inventors: Ching-Shun Wang, TamShui (TW); Chun-Hua Hsia, TamShui (TW)

(73) Assignee: Advanced Connection Technology, Inc., TamShui (TW)

( * ) Notice: Subject to any disclaimer, the term of this patent is extended or adjusted under 35 U.S.C. 154(b) by 181 days.

(21) Appl. No.: 12/782,901

(22) Filed: May 19, 2010

(65) Prior Publication Data

US 2011/0157939 A1    Jun. 30, 2011

(30) Foreign Application Priority Data

Dec. 28, 2009 (TW) .............................. 98145255 A (51) Int. Cl.
  *H02M 1/00*  (2007.01)

(52) U.S. Cl. ....................................................... 363/146

(58) Field of Classification Search ................. 363/146
See application file for complete search history.

(56) References Cited

U.S. PATENT DOCUMENTS

| | | | | |
|---|---|---|---|---|
| 4,237,385 | A | * 12/1980 | Jurgens et al. | 307/66 |
| 7,911,817 | B2 | * 3/2011 | Kasprzak et al. | 363/146 |
| 2011/0157939 | A1 | 6/2011 | Wang et al. | |
| 2011/0286250 | A1 | * 11/2011 | Wang et al. | 363/125 |

OTHER PUBLICATIONS

Office Action for U.S. Appl. No. 12/969,958 dated Jan. 20, 2012, pp. 1-12.

* cited by examiner

*Primary Examiner* — Jue Zhang
(74) *Attorney, Agent, or Firm* — Ditthavong Mori & Steiner, P.C.

(57) ABSTRACT

A power adapter apparatus and a power management method thereof are disclosed in the invention. The power adapter includes an output interface and a power modulation unit. The power adapter can be electrically connected with an electronic device through the output interface. There is a detective structure disposed on the output interface. The power management method includes steps of: 1) detecting whether the power adapter apparatus is electrically connected with the electronic device by the detective structure; and 2) when the output interface is detected to be disconnected from the electronic device, switching the power modulation unit to a standby state, so as to reduce a total power consumption of the power modulation unit.

3 Claims, 6 Drawing Sheets

POWER ADAPTER APPARATUS AND POWER MANAGEMENT METHOD

CROSS-REFERENCES TO RELATED APPLICATIONS

This non-provisional application claims priority under 35 U.S.C. §119(a) on Patent Application No. 98145255 filed in Taiwan, R.O.C. on 2009 Dec. 28, the entire contents of which are hereby incorporated by reference.

BACKGROUND OF THE INVENTION

1. Technical Field

The invention relates to a power adapter apparatus. More particularly, the invention relates to a power adapter apparatus and a power management method thereof, which the power adapter apparatus is capable of reducing its static power consumption when it is disconnected from the load.

2. Related Art

With the development of information technology, the electronic products are widespread in business, household and personal applications, e.g. personal computers, televisions, video recorders, multimedia players, printers, copy machines, etc. Aforesaid electronic devices may need different power supply (e.g. specific voltage, specific current or specific power ratio) under different working state. In order to make sure these electronic devices work properly, providing a regular and stable power source is a must.

Generally, electronic devices may includes lots of semiconductor components, which can be driven by a direct-current (DC) signal with a voltage ranged from 3 Volts to 12 Volts. Common household outlet may provide an alternating-current (AC) signal with a voltage ranged from 110 Volts to 220 Volts. Therefore, the household power source can not be applied on these electronic devices directly. An adapter is needed here for converting the AC signal (110V~220V) to an adequate DC signal. Then, the adapter may supply the converted signal to these electronic devices.

Adapters in prior art may include a metal winding transformer, a rectification component, a voltage-stabilizer circuit and also some other controlling circuits. Generally, once traditional adapter is connected to an external power source (such as household outlet), the metal winding transformer and the voltage-stabilizer circuit in the adapter start to cause a certain degree of static power consumption even the adapter is not driving any electronic load (electronic device). The degree of the static power consumption may be affected by winding turns of the transformer, the material of the metal core or some other designs in the adapter.

Generally, one terminal of adapter is designed to be electrically connected with a household outlet, and the other terminal of adapter is designed for transmitting electricity to electronic devices. In practical applications, the household outlets are sometimes disposed on some surfaces which are hard to reach from users. Therefore, the adapters around us are usually connected to household outlets all the time no matter if the adapters drive any electronic device or not. Common users tend to let adapter plugged on the outlet all day long. In this case, the adapter without actually driving any load may cause a waste of energy.

In order to solve aforesaid problem, the invention discloses a power adapter apparatus and a power management method thereof. The power adapter may utilize a specific detective structure for detecting whether the power adapter apparatus is electrically connected to an electronic device. When it is disconnected from the electronic device, the power adapter can be switched to a standby state, so as to solve the aforesaid problem.

SUMMARY OF THE INVENTION

A scope of the invention is to provide a power adapter apparatus, which is suitable for supplying electricity to an electronic device.

According to an embodiment of the invention, the power adapter apparatus includes an output interface, a power modulation unit, a control unit and a detection unit. The output interface has a detective node. The power modulation unit is electrically connected with an external power source. The power modulation unit is coupled to the output interface. The control unit is coupled to the power modulation unit. The detection unit is coupled to the detective node and the control unit.

When the detection unit detects that the output interface is connected to the electronic device according to a voltage level of the detective node, the detection unit informs the control unit to switch the power modulation unit into a working state, such that the power modulation unit modulates on the external power source and supplies electricity to the output interface for driving the electronic device.

On the other hand, when the detection unit detects that the output interface is disconnected from the electronic device according to the voltage level of the detective node, the detection unit informs the control unit to switch the power modulation unit into a standby state, so as to reduce a total power consumption of the power modulation unit.

According to another embodiment of the invention, the power adapter apparatus includes an output interface, a power modulation unit, a control unit and a detection unit. The output interface has a telescopic switch. The telescopic switch is movably disposed on a surface of the output interface. The power modulation unit is electrically connected with an external power source. The power modulation unit is coupled to the output interface. The control unit is coupled to the power modulation unit. The detection unit is coupled to the detective node and the control unit.

When the detection unit detects that the output interface is connected to the electronic device according to a telescopic state of the telescopic switch, the detection unit informs the control unit to switch the power modulation unit into a working state, such that the power modulation unit modulates on the external power source and supplies electricity to the output interface for driving the electronic device.

On the other hand, when the detection unit detects that the output interface is not connected to the electronic device according to the telescopic state of the telescopic switch, the detection unit informs the control unit to switch the power modulation unit into a standby state, so as to reduce a total power consumption of the power modulation unit.

A scope of the invention is to provide a power management method, which is suitable for a power adapter apparatus. The power adapter apparatus includes an output interface and a power modulation unit. The power adapter apparatus utilizes the output interface for electronically connecting to an electronic device. The output interface includes a detective structure.

According to an embodiment of the invention, the power management method includes steps of:

(1) Utilize the detective structure to detect whether the power adapter apparatus is electronically connected to the electronic device or not.

(2) When the output interface being disconnected from the electronic device, switch the power modulation unit to a standby state for reducing a total power consumption of the power modulation unit.

Compared to prior art, the power adapter apparatus and the power management method of the invention may utilize a specific detective structure (electronic detective node or mechanical telescopic switch) for detecting whether the power adapter apparatus is electrically connected to the electronic device or not. When it is disconnected from the electronic device, the power modulation unit in the power adapter apparatus is switched to the standby state, so as to reduce the total power consumption of the power adapter apparatus.

The advantage and spirit of the invention may be understood by the following recitations together with the appended drawings.

DETAILED DESCRIPTION

Figure 1:
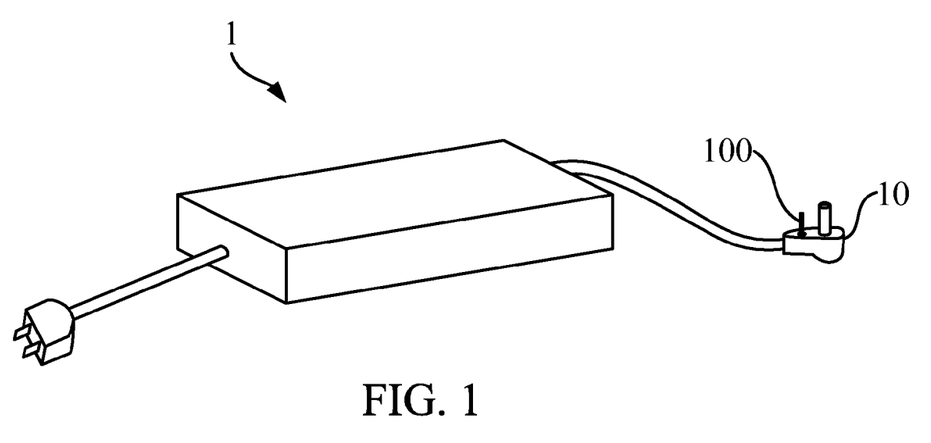
FIG. 1 is an outside view illustrating a power adapter apparatus according to a first embodiment of the invention.
Figure 2:
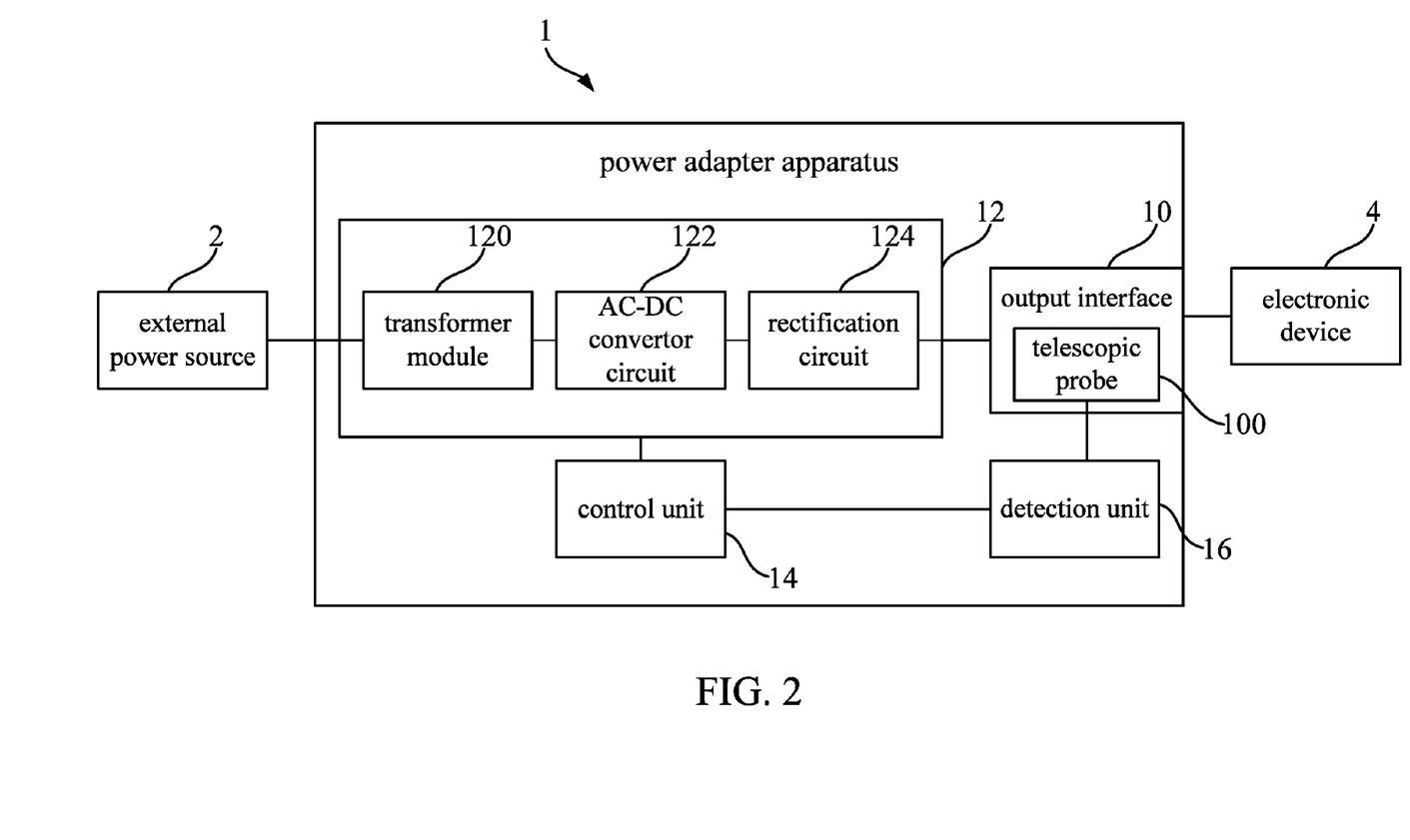
FIG. 2 is a functional block diagram illustrating the power adapter apparatus in FIG. 1.

Please refer to FIG. 1 and FIG. 2. FIG. 1 is an outside view illustrating a power adapter apparatus 1 according to a first embodiment of the invention. FIG. 2 is a functional block diagram illustrating the power adapter apparatus 1 in FIG. 1. In the embodiment, the power adapter apparatus 1 includes an output interface 10, a power modulation unit 12, a control unit 14 and a detection unit 16.

As shown in FIG. 1, there is a telescopic switch 100 on a surface of the output interface 10. In this case, the telescopic switch 100 is movably disposed on the surface of the output interface 10. The telescopic switch 100 can be shaped as a telescopic probe shown in FIG. 1, but the invention is not limited to this. In practical applications, there may be a flexible component (such as spring, metal sheet or rubber pad) disposed under the telescopic switch 100 for providing the flexibility.

The power modulation unit 12 is electrically connected to an external power source 2. The power modulation unit 12 is coupled to the output interface 10. In practical applications, the external power source can be a household power source, such as a household outlet. The power modulation unit 12 is used for modulating on the household power source. For example, the power modulation unit 12 may include a transformer module 120, an AC-DC convertor circuit 122 and a rectification circuit 124. The power modulation unit 12 is used for converting the household power signal provided by the external power source 2 (the household power signal is usually an AC signal from 110V to 220V in Taiwan) into an adequate output power signal.

Take an operational example for demonstration, the power modulation unit 12 may utilize the transformer module 120 and the AC-DC convertor circuit 122 to convert an AC input (with 110~220 Volts and 1.5 Amp) into a DC output (with 19 Volts and 3.42 Amp). Then the DC output may go through the process of the rectification circuit 124 and be transmitted to the output interface 10, so as to drive an electronic device 4 (e.g. computer, television, mobile phone, printer or other electronic product) which is coupled with the output interface 10.

The control unit 14, coupled with the power modulation unit 12, is used for controlling the working state of the internal components (i.e. the transformer module 120, the AC-DC convertor circuit 122 and the rectification circuit 124) in the power modulation unit 12. In this case, the control unit 14 may selectively turn on each component in the power modulation unit 12 and make the component switch into a working state; or on the contrary, the control unit 14 may turn off any component in the power modulation unit 12 and make the component switch into a standby state.

When the power modulation unit 12 is switched to the standby state, the control unit 14 may regulate the power modulation unit 12, so as to make the power modulation unit 12 stop supplying any electricity to its internal components, or only supply a minimum standby voltage to those internal components for maintaining some basic standby functions of the power modulation unit 12. In this embodiment, the power consumption of the power modulation unit 12 under the standby state can be reduced to 0.02 Watt/hour.

In this embodiment, the detection unit 16 is coupled with the telescopic switch 100 and the control unit 14. When a user wants to supply electricity through the power adapter apparatus 1 to the electronic device 4, the user may insert the output interface 10 of the power adapter apparatus 1 into a power jack (not shown) of the electronic device 4. When the output interface 10 is connected with the electronic device 4, the telescopic switch 100 can be pressed down by the casing of the electronic device 4.

When the detection unit 16 detects that the telescopic switch 100 is pressed down, the detection unit 16 may determine that the output interface 10 has already been connected to the electronic device 4 according to the telescopic state. At this moment, the detection unit 16 informs the control unit 14 to switch the power modulation unit 12 into a working state, such that the power modulation unit 12 modulates on the external power source 2 and supplies electricity to the output interface for driving the electronic device 4.

On the other hand, when the user remove the connection relationship between the power adapter apparatus 1 and the electronic device 4, the telescopic switch 100 will bounce back to its original position due to the releasing flexible force from the flexible component. When the detection unit 16 detects that the output interface 10 is disconnected from the electronic device 4 according the telescopic state of the telescopic switch 100, the detection unit 16 informs the control unit 14 to switch the power modulation unit 12 into a standby state. Accordingly, the internal components of the power modulation unit 12 are turned off or operating at a low standby voltage, so as to reduce a total power consumption of the power modulation unit 12.

In aforesaid embodiment, the power adapter apparatus 1 detects whether it is connected with the electronic device 4 according to a mechanical telescopic switch, such that the power modulation unit 12 can be switched into the standby state timely when the power adapter apparatus 1 is disconnected from the electronic device 4. However, the invention is not limited to this kind of detective structure, i.e. utilizing the mechanical telescopic switch.

Figure 3:
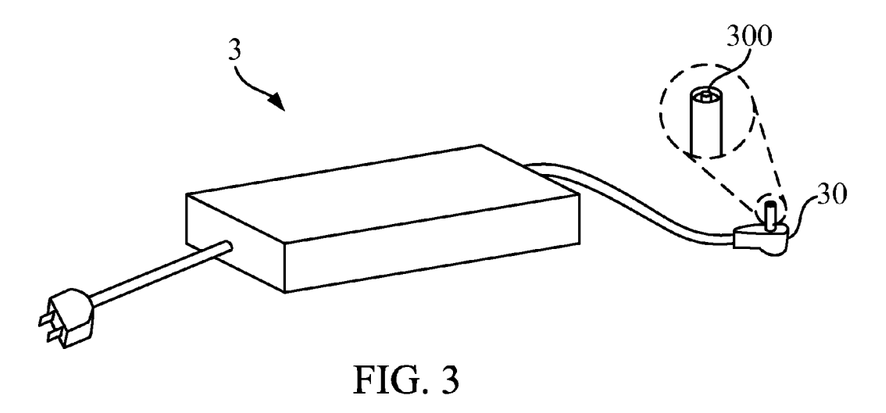
FIG. 3 is an outside view illustrating the power adapter apparatus according to a second embodiment of the invention.
Figure 4:
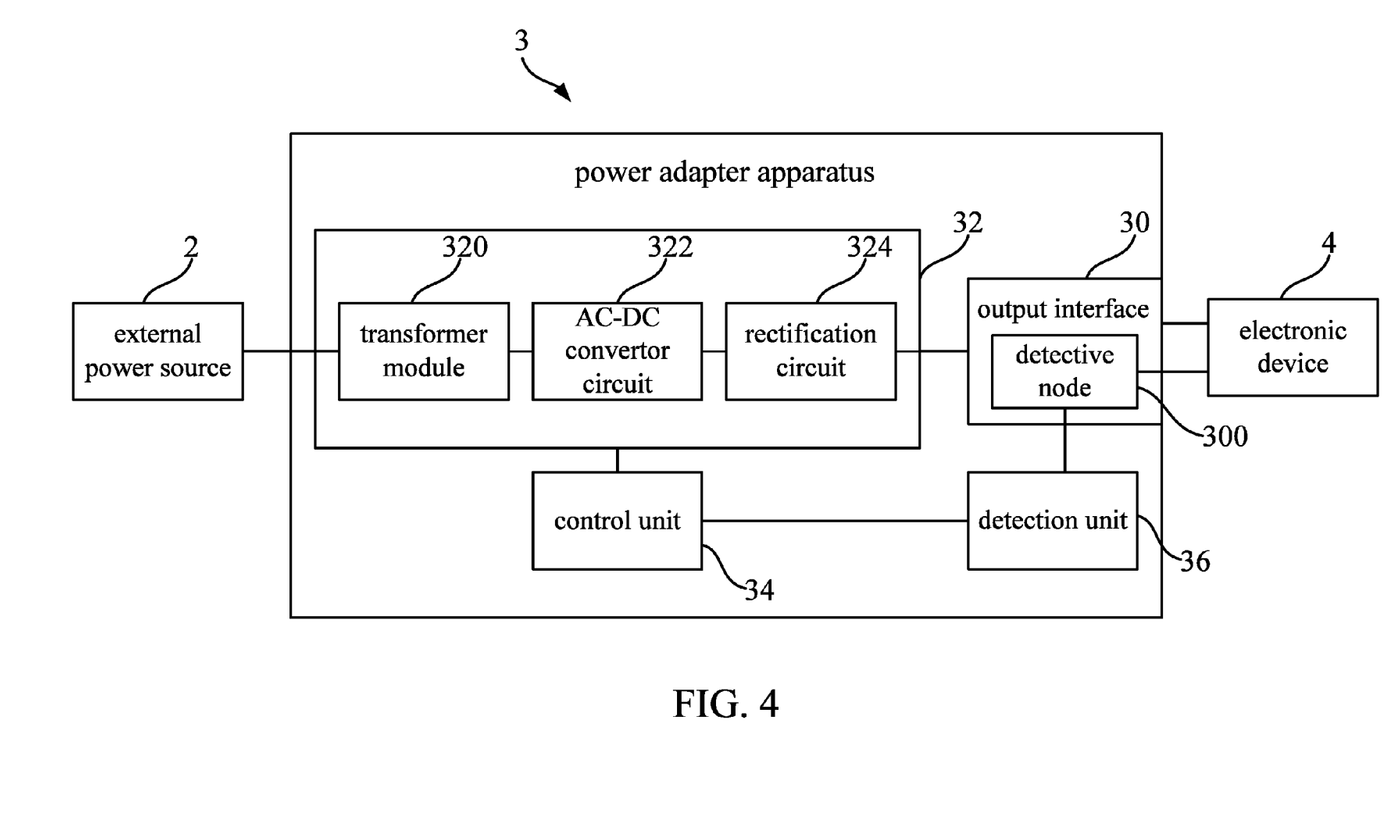
FIG. 4 is a functional block diagram illustrating the power adapter apparatus in FIG. 3.

Please refer to FIG. 3 and FIG. 4. FIG. 3 is an outside view illustrating the power adapter apparatus 3 according to a second embodiment of the invention. FIG. 4 is a functional block diagram illustrating the power adapter apparatus 3 in FIG. 3.

The power adapter apparatus 3 includes an output interface 30, a power modulation unit 32, a control unit 34 and a detection unit 36. The main difference from the first embodiment is that there is an extra detective node 300 disposed on the original power supply pin of the output interface 30 in this embodiment. As shown in FIG. 3, the detective node 300 can be the extra rod-shaped pin disposed in-between the original power supply pin. In practical applications, the detective node may also be a ring-shaped pin disposed around the original power supply pin, or any pin other than the original power supply pin in any shape. The way to implement an extra contact point for the detective node is well known by a person in the art, so not to be further mentioned here.

In the second embodiment, the detection unit 36 is used for detecting whether the output interface 30 is connected to the electronic device 4 or not according to a voltage level of the detective node 300.

Figure 5:
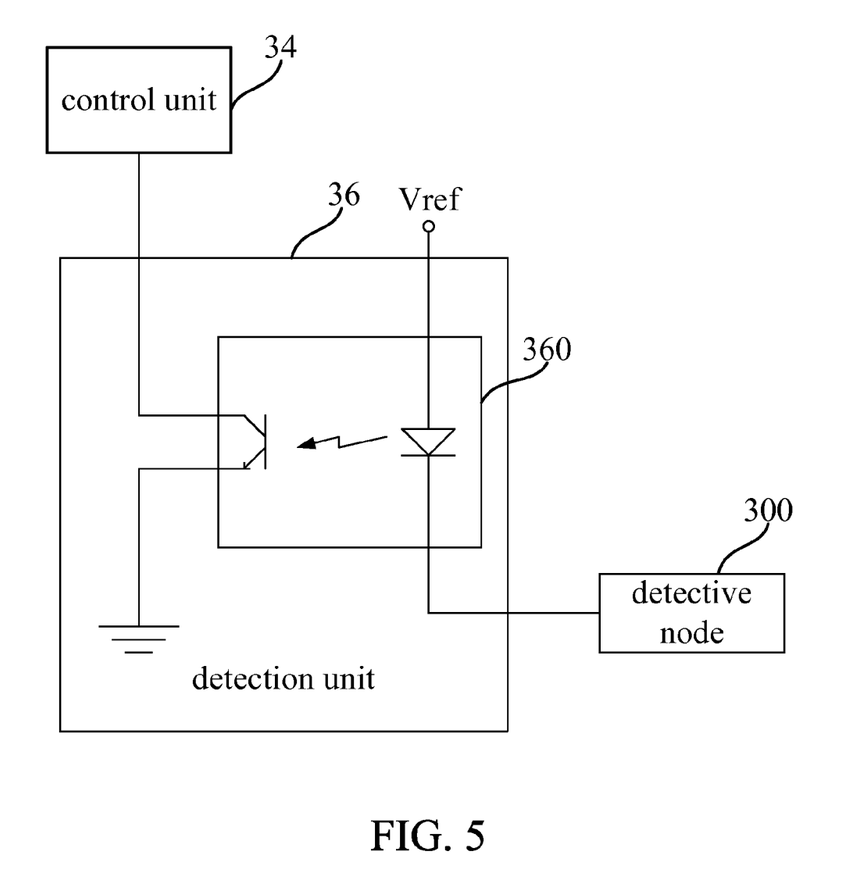
FIG. 5 is a circuit schematic diagram illustrating the detection unit in the second embodiment of the invention.

Please refer to FIG. 5. FIG. 5 is a circuit schematic diagram illustrating the detection unit 36 in the second embodiment of the invention. In this embodiment, the detection unit 36 may includes an optical coupling switch 360. The optical coupling switch 360 has two input terminals. One of the input terminals is coupled to a reference voltage Vref, and the other one is coupled to the detective node 300.

The optical coupling switch 360 generates a judgmental result signal corresponding to a connection relationship between the output interface 30 and the electronic device 4 according to a voltage difference between the reference voltage Vref and the voltage level of the detective node 300. Then, the detection unit 36 transmits the judgmental result signal to the control unit 34, so as to inform the control unit 34 to activate following actions.

There is an operational example for demonstrating the judging mechanic of the detection unit 36 and the optical coupling switch 360. In this example, the reference voltage Vref can be assigned to the Vdd voltage at system level, e.g. Vref may equal to 5 Volts.

When the output interface 30 is disconnected from the electronic device 4, the detective node 300 is floating, such that the voltage difference between the detective node 300 and the reference voltage Vref is also floating. In this case, the optical coupling switch 360 is inactive. Then the control unit 34 can switch the power modulation unit 32 to a standby state, for reducing the total power consumption of the power modulation unit 32.

When the output interface 30 is connected to the electronic device 4, the detective node 300 can be coupled to a Ground terminal (at 0 Volts) on the electronic device 4, such that the voltage level of the detective node 300 is pulled low. In this case, the voltage difference between the detective node 300 (0 Volts) and the reference voltage Vref (5 Volts) becomes 5 Volts. This voltage difference may activate the optical coupling switch 360 to generate the judgmental result signal for informing the control unit 34.

Therefore, the control unit 34 can switch the power modulation unit 34 into a working state, such that the power modulation unit 34 modulates on the external power source and supplies electricity to the output interface 30 for driving the electronic device 4.

Besides, the invention also discloses a power management method. The power management method is suitable for a power adapter apparatus. Please refer to aforesaid embodiments (the first and the second embodiment) for understanding the detail structure of the power adapter apparatus. The power adapter apparatus includes an output interface and a power modulation unit. There is a detective structure (e.g. an electronic detective node or a mechanic telescopic switch) disposed on the output interface of the power adapter apparatus.

Figure 6:
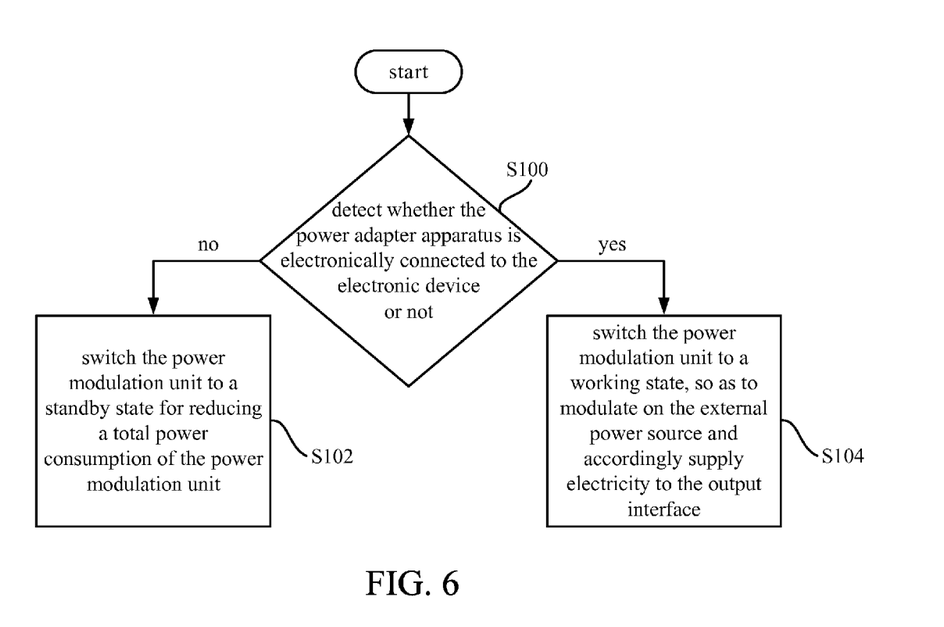
FIG. 6 is a flow chart illustrating the power management method according to a third embodiment of the invention.

Please refer to FIG. 6. FIG. 6 is a flow chart illustrating the power management method according to a third embodiment of the invention. As shown in FIG. 6, step S100 of the power management method is executed to utilize the detective structure for detecting whether the power adapter apparatus is electronically connected to the electronic device or not.

When the output interface is detected to be disconnected from the electronic device, step S102 is executed to switch the power modulation unit into a standby state, for reducing a total power consumption of the power modulation unit.

On the other hand, when the output interface is detected to be electrically connected to the electronic device, step S104 is executed to switch the power modulation unit into a working state, such that the power modulation unit is utilized to modulate on the external power source and supply electricity to the output interface for driving the electronic device.

In other words, the power adapter apparatus and the power management method of the invention may utilize a specific detective structure (electronic detective node or mechanical telescopic switch) for detecting whether the power adapter apparatus is electrically connected to the electronic device or not. When it is disconnected from the electronic device, the power modulation unit in the power adapter apparatus is switched to the standby state, so as to reduce the total power consumption of the power adapter apparatus.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A power adapter apparatus, suitable for supplying power to an electronic device, the power adapter apparatus comprising:

an output interface having a telescopic switch, the telescopic switch being movably disposed on a surface of the output interface;

a power modulation unit electrically connected with an external power source, the power modulation unit being coupled to the output interface;

a control unit coupled to the power modulation unit; and a detection unit coupled to the detective node and the control unit;

wherein when the detection unit detects that the output interface is connected to the electronic device according to a telescopic state of the telescopic switch, the detection unit informs the control unit to switch the power modulation unit into a working state, such that the power modulation unit modulates on the external power source and supplies electricity to the output interface for driving the electronic device;

wherein when the detection unit detects that the output interface is not connected to the electronic device according to the telescopic state of the telescopic switch, the detection unit informs the control unit to switch the power modulation unit into a standby state, so as to reduce a total power consumption of the power modulation unit.

2. The power adapter apparatus of claim 1, wherein the power modulation unit comprises a transformer module.

3. The power adapter apparatus of claim 1, wherein the external power source comprises a household outlet.

* * * * *